United States Patent
Urs et al.

(10) Patent No.: US 11,824,342 B2
(45) Date of Patent: *Nov. 21, 2023

(54) COMPACT TRANSMISSION LINE STRUCTURE

(71) Applicant: National Grid plc, Waltham, MA (US)

(72) Inventors: Amit Urs, Brookline, MA (US); Mark S. Browne, North Grafton, MA (US)

(73) Assignee: National Grid plc, Waltham, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,432

(22) Filed: Oct. 6, 2022

(65) Prior Publication Data

US 2023/0178973 A1    Jun. 8, 2023

Related U.S. Application Data

(63) Continuation of application No. 17/087,469, filed on Nov. 2, 2020, now Pat. No. 11,482,848.

(51) Int. Cl.
*H02G 7/20* (2006.01)
*H02G 7/05* (2006.01)
*H02G 7/08* (2006.01)

(52) U.S. Cl.
CPC .............. *H02G 7/20* (2013.01); *H02G 7/053* (2013.01); *H02G 7/08* (2013.01)

(58) Field of Classification Search
CPC ............ H02G 7/20; H02G 7/053; H02G 7/08; H02G 7/12; H02G 7/125; H02G 7/205; H02G 7/00; H02G 7/05; H02G 7/14; H02G 7/056; H02G 1/12; H02G 7/02; F16L 3/1233; F16L 3/00; H01R 4/643; H01R 4/64

USPC ....... 174/40 R, 41, 42, 44, 43, 45 R, 45 TD, 174/40 TD; 248/200, 205.1; 52/651.02, 52/651.03, 40, 697

See application file for complete search history.

(56) References Cited

U.S. PATENT DOCUMENTS 3,264,400 A * 8/1966 Taylor ............... H02G 7/14
                                                    174/148
4,458,102 A * 7/1984 White ............... H02G 7/20
                                                    174/149 R

(Continued)

*Primary Examiner* — Angel R Estrada
(74) *Attorney, Agent, or Firm* — Eversheds Sutherland (US) LLP (57) ABSTRACT

Devices, systems, and methods are provided for compact transmission lines structure. A compact transmission lines structure may comprise a first subsystem of a pole and a crossarm, wherein the crossarm is stacked above the pole, wherein the crossarm comprises a cantilever end situated away from the pole. The compact transmission lines structure may comprise a second subsystem connected to the cantilever end. The second subsystem comprising a first diamond-shaped insulator assembly supporting a first single three-phase transmission line. The compact transmission lines structure may comprise a third subsystem connected to the cantilever end, the third subsystem comprising a second diamond-shaped insulator assembly supporting a second single three-phase transmission line, wherein the second diamond-shaped insulator assembly mirrors the first diamond-shaped insulator assembly. The compact transmission lines structure may comprise at least two shield wires configured to provide lightning protection.

24 Claims, 7 Drawing Sheets

(56) References Cited

U.S. PATENT DOCUMENTS

| | | | |
|---|---|---|---|
| 7,501,574 B1 * | 3/2009 | Graham | H02G 7/20 174/45 R |
| 9,685,772 B2 * | 6/2017 | Carreira | H02G 7/20 |
| 9,698,585 B2 * | 7/2017 | Ma | E04H 12/24 |
| 10,205,312 B2 * | 2/2019 | Ma | E04H 12/24 |
| 10,476,249 B2 * | 11/2019 | Lindsey | H02G 7/20 |
| 11,482,848 B2 * | 10/2022 | Urs | H02G 7/053 |

* cited by examiner

COMPACT TRANSMISSION LINE STRUCTURE

CROSS-REFERENCE TO RELATED PATENT APPLICATION(S)

This application is a continuation of and claims the benefit of U.S. Non-Provisional application Ser. No. 17/087,469, filed Nov. 2, 2020, the disclosures of which are incorporated by reference as set forth in full.

TECHNICAL FIELD

This disclosure generally relates to systems and methods for compact transmission line structure.

BACKGROUND

Stakeholders expect reliable and less expensive power from clean energy sources. Large-scale wind farms or solar facilities are in remote areas and need to deliver it to population centers where renewable power is needed. High capacity transmission links are required to connect new renewable sources with the transmission Grid. Also, Stakeholders demand the use of existing corridors and minimize the impact of works, visually and environmentally. This may cause spatial constraints when working within constricted right-of-way widths. Utilities have overcome the spatial constraint by adopting line compaction. By optimal phase arrangement, utilities have achieved vertical line compaction by using a flat phase arrangement and horizontal line compaction by a vertical or delta phase arrangement. In a congested corridor where many lines run parallel to each other, the spatial constraint is overcome by line compaction in the horizontal direction. At a junction when multiple line corridors cross each other, the multi-directional spatial constraint is overcome by line compaction in both vertical and horizontal directions. It is well understood that line compaction at the structure, by reducing: distances between phases; phase to shield wire spacing; structure height, and width, must meet safety code requirements and maintaining minimum electrical clearance to ensure employee safety and public safety. Therefore, efforts are focused on mechanisms for line compaction to accommodate stakeholder demand to build high capacity transmission lines within the existing corridor.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

In shared transmission line corridors there may be multiple transmission lines used to carry electrical power between a source and a load center. Such transmission line corridors may result in one or more junctions where these multiple transmission lines may meet or cross each other and cause congestion. According to the safety code, within a junction, a certain distance may need to be maintained between each of these transmission lines to provide proper working clearance. In case that distance is not maintained, employee and public safety issues may arise.

Proper conductor clearance to the structure aid in the operation, and maintenance activities to prevent outages and improve safety and reliability of the transmission lines. Although the transmission lines may maintain proper clearance to the structure, clearance to adjacent conductor, and adjacent structure supporting the line is equally important for personnel and public safety.

In some examples, when new transmission lines need to pass through a junction, where there may be six to eight transmission lines that may cross each other (e.g., four lines may go over four lines), it causes multi-directional spatial constraints, the compact transmission line structure may provide a solution to spatial constraints. The spatial constraints are overcome by adopting line compaction: first hypothetical conductor clearance envelopes are determined to set the vertical and horizontal clearances; second conductor movement envelopes for various phase conductor arrangements are developed to determine the closest proximity between two conductors; and next, a structure type is selected that supports the conductor arrangement to achieve line compaction in the vertical and horizontal direction.

In one or more embodiments, a compact transmission line structure system may be used in congested right-of-way widths to carry one or more over head transmission lines while maintaining a proper clearance between phases and between one or more adjacent transmission lines supported on different structures.

Furthermore, in one or more embodiments, a compact transmission line structure system may be used at constricted junctions to carry one or more over head transmission lines within very tight clearance window, wherein the diamond-shaped insulator assembly is restrained from movement in the transverse direction. This compact structure may be needed without this compact structure; the entire junction may need to be rebuilt to make space for additional transmission lines that may need to be added. In order to rebuild an entire junction, costs may be very large in addition to the outage that may not be possible to get while a new design is being implemented.

Example embodiments described herein provide certain systems, methods, and devices for a compact transmission line structure. The compact structure is a whole system, which consist of subsystems or subsets: a short structure and one or more diamond-shaped insulator assembly, that facilitate a compact mechanism to arrange transmission lines in a tight space while maintaining the proper clearance requirement. Each subsystem comprises of parts or module. The compact transmission line structure system may be made compact by restraining the diamond-shaped insulator assembly.

In one or more embodiments, a compact transmission line structure system may utilize a modular design, where in the parts or modules may be individually fabricated in shop and then shipped to the site where they may be assembled into an intended form. A modular structure may generate lighter pieces to handle and transport. This aids simple installation and maintenance methods. The compact structure may take two aesthetically pleasing forms: T shape; or an inverted L shape, where in T-Structure may be configured to support two transmission lines and inverted L-Structure may be configured to support one transmission line. The form created for optimal function may lower visual impact.

In one or more embodiments, a compact transmission line structure subsystem may consists of a short structure assembly comprised of: a multi section pole and a unique monolithic crossarm, wherein the crossarm may be stacked above the pole, with the end plate at the cantilever end of the crossarm away from the pole may facilitate an interconnection with one or more diamond-shape insulator assembly. Stacking the monolithic cross arm above the pole, using a bolted flange connection in bearing eliminates the need for special construction means and methods to support the crossarm while installing flange connection. This stacking concepts eliminates shear or tension forces in bolts during install and improves construction safety, improves constructability—aligning the flange plates and mating the holes on a horizontal plane is much easier than in vertical plane.

Assembling modules by stacking may provide a safe construction method during the assembly of a subsystem. Further, the short structure may eliminate cambering, reduce size of the pole base diameter and reduce foundation size. Also, short structures are easy to permit and reduces visual impact.

In one or more embodiments, a module in a compact transmission line structure subsystem may comprise of a central pole made up of multiple section connected through a flange connection.

In one or more embodiments, a module in a compact transmission line structure subsystem may comprise of a monolithic crossarm made up of a vertical portion called ascender and one or two section assemblies wherein each section may comprise of a first portion called the arm, and a second portion called the beak. The arm connects to a ascender portion of the crossarm at a predetermined angle, and the beak portion connects to the arm portion at a predetermined angle. One left section or right section attached to a central ascender form a crossarm for inverted L-Structure; two sections, right section and the left section comprise of mirror image parts, attached to a central ascender forms a crossarm for a T-Structure. The functionality of the system is improved by the unique shape of the crossarm that may provide the needed clearance to the structure when conducting phases swing due to wind and the method of attachment at the beak that may allow a diamond-shaped insulator assembly to articulate in the transverse and longitudinal direction.

In one or more embodiments, a compact transmission lines structure subsystem may consist of one or more diamond-shaped insulator assembly comprised of parts: four perimeter insulators, an inner post insulator, phase conductor clamps and yoke plates, wherein each part is interconnected to another to form diamond-shaped section. For example, in the case of two diamond-shaped insulator assemblies, a T-Structure may be used to support these two assemblies situated on either side of the pole; in the case of one diamond shaped insulator assembly, an inverted L-Structure may be used to support one assembly situated on one side of pole. The diamond-shaped section may be comprised of four points, where each of these four points may include a yoke plate assembly. For example, the inner point of the diamond-shaped insulator assembly may be the point closest to the center pole, the outer point may be the point farthest from the center pole, the upper point may be the point that connects the diamond-shaped insulator assembly to the beak, and the lower point may be the point closest to the ground opposite the upper point of the diamond-shaped insulator section. The diamond-shaped insulator assembly is configured to provide satisfactory lightning performance, switching overvoltage performance and contamination performance. Also, it has been designed to withstand the mechanical loads.

In one or more embodiments, a compact transmission lines structure auxiliary subsystem may consist of one restraint insulator assembly comprising of two parts: a post insulator and a specially designed side yoke plate, where in the side yoke plate is connected to post insulator to form the auxiliary subsystem. For example, the conductor transverse movement at the structure can be eliminated by using auxiliary subsystem, wherein the one end of the subsystem consisting of the side yoke plate may be connected to an inner point of the diamond-shaped section and the other end comprising of the post insulator connected to the pole. The post insulator connection at the pole has a hinge, wherein the hinge allows the rotation of the insulator assembly in a horizontal plane (about vertical axis) and not in a vertical plane (about the longitudinal axis). In one or more embodiments, a module in a compact transmission line structure system may comprise of insulators made up of four perimeter polymer insulators and an inner polymer post insulator, wherein the perimeter insulators connect the that connects the yoke plates associated with each of these four points to form the shape of the diamond; and to ensure the shape is maintained the inner point and the outer point may be directly connected together using a post insulator that connects the yoke plates associated with each of these points. The diamond shape allows compact arrangement of conductors. Further, compared to porcelain insulators, polymer insulator offer better flashover performance in contaminated areas and weighs significantly less making material handling much easier. Installing diamond shape insulator assembly is simple and quick.

In one or more embodiments, a module in a compact transmission line structure system may comprise of conductor clamps, wherein a first phase conductor may be connected to the inner point, a second phase conductor may be connected to the outer point, and a third phase conductor may be connected to the lower point, forming a equilateral delta or isosceles delta configuration, which may reduce magnetic field near the ground level.

In one or more embodiments, a module in a compact transmission lines structure system comprise of yoke plates used at four points to interconnect various parts of the diamond-shaped insulator assembly. For example, yoke plate assembly at the inner and outer points are identical, configured to interconnect two perimeter insulators, a post insulator and a conductor clamp; the yoke plate assembly at the upper point is configured to interconnect two perimeter insulator and strap assembly; the yoke plate assembly at the lower point is configured to interconnect two perimeter insulator and a conductor clamp. The yoke plate may be designed to limit sharp corners and edges to minimize corona formation. Corona rings may be installed on the perimeter insulators at the inner point, outer and lower point of the diamond-shaped insulator assembly to minimize the effects of corona. The phenomenon of ionization of surrounding air around the conductor due to which luminous glow with hissing noise is rise is known as the corona effect.

In one or more embodiments, a compact transmission lines structure system may further comprise a shield wire positioned at a location where the arm and the beak portion of a section assembly of the crossarm meet. A shield wire may protect against lightning strokes. If lightning strikes, it would hit the shield wire because it is on top of the structure. The shield wire may protect the actual transmission line from an electrical surge due to the lightning stroke, which may cause a station to trip where the transmission line is connected. Further, the shield wire may be positioned in order to provide a shielding angle of about 30°.

The above descriptions are for purposes of illustration and are not meant to be limiting. Numerous other examples, configurations, processes, etc., may exist, some of which are described in greater detail below. Example embodiments will now be described with reference to the accompanying figures.

Figure 1:
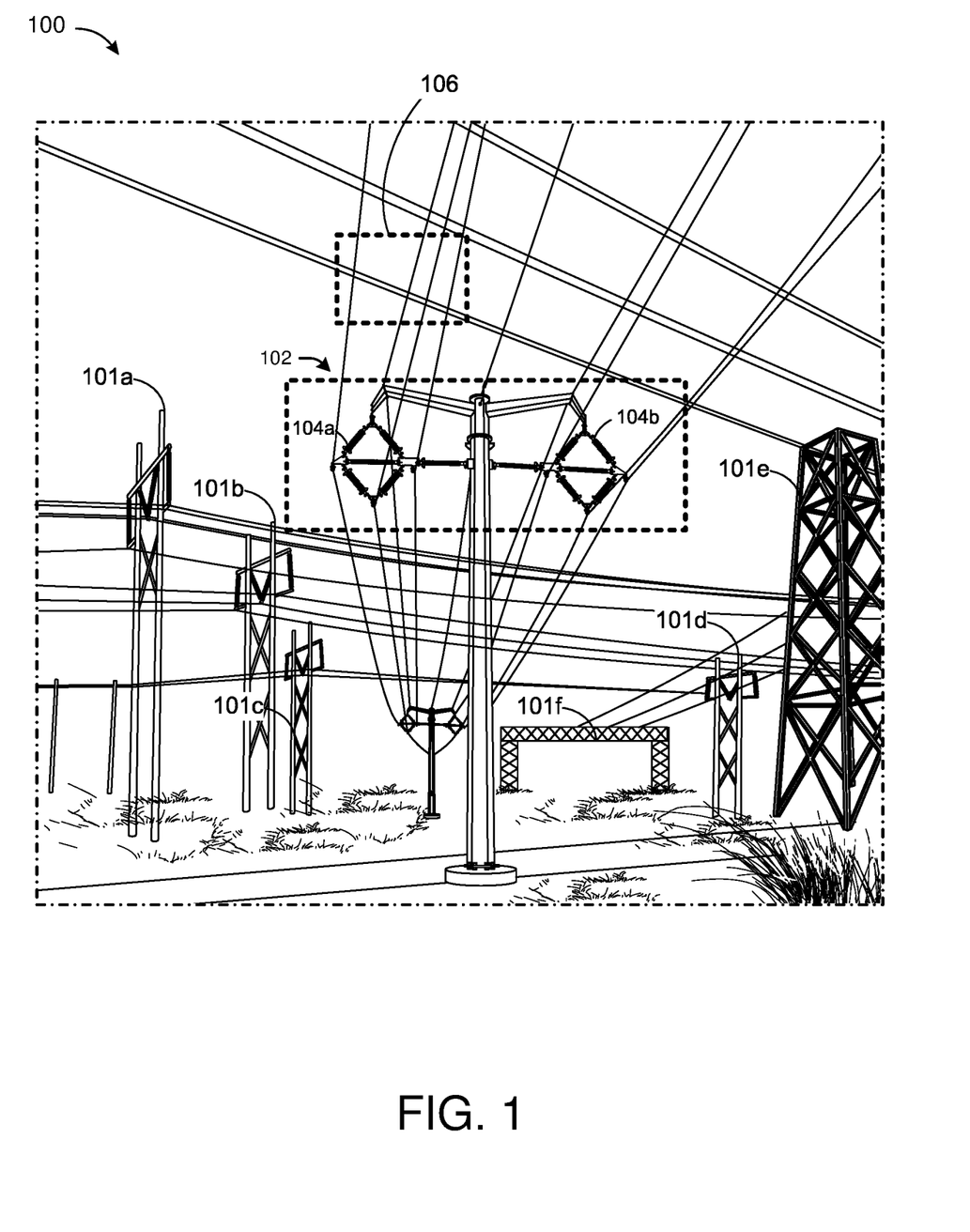
FIG. 1 illustrates an example congested environment of a transmission lines junction multiple transmission lines supported on towers cross each other, in accordance with one or more example embodiments of the present disclosure.

FIG. 1 illustrates example environment 100 of a transmission lines junction having a plurality of transmission lines and a plurality of towers carrying the transmission lines, in accordance with one or more example embodiments of the present disclosure.

Referring to FIG. 1, there is shown a plurality of transmission lines towers (e.g., towers 101a-f, and a T-structure tower 102). These transmission lines towers carry conductors that deliver signals between sources and targets. For example, an electrical power station may deliver electricity using conductors suspended in the air or buried underground to targets such as homes, businesses, or other premises. The larger the number of transmission lines towers, the larger the number of conductors suspended in the air. This would result in congestion leading to one or more issues. For example, as can be seen in FIG. 1, a plurality of transmission lines may cross each other such that some will be above or below other transmission lines either in a parallel fashion or at an intersecting angle. As can be appreciated, interference and public safety issues may result in the increased number of intersecting transmission lines not to mention the increased costs associated with additional wires that may be needed to be added at a junction. FIG. 1 shows a clearance window 106 such that one or more transmission lines may be pierced through it. The clearance window 106 may be determined to have a specific area to allow a certain number of transmission lines to be adjacent to each other. For example, as shown in FIG. 1, the clearance window 106 shows about six transmission lines that may be within the boundaries of the clearance window 106. This clearance window 106 may be determined based on a certain design code such that the density of transmission lines within a determined space must not exceed a threshold. Ensuring cables meet the design code may minimize interferences between transmission lines and public safety issues.

Referring to FIG. 1, there is shown a compact transmission lines structure 102. The compact transmission line structure 102 may be comprised of the plurality of parts that allow a condensed and compacted way of carrying a number of transmission lines while maintaining the proper conductive clearance. The compact transmission line structure 102 may be in the form of a T-shaped structure, wherein each part of the T portion comprises a diamond-shaped assembly (e.g., diamond-shaped assemblies 104a and 104b). Diamond-shaped assemblies 104a and 104b each carry three conductors that are hanging at each end of the diamond-shaped assembly except for the top and of the diamond-shaped assembly, where the T portion is attached to the diamond-shaped assembly.

In one or more embodiments, compact transmission lines structure 102 may utilize the T-Structure that may be comprised of one or more sections that form a modular design. The T-Structure may be erected by stacking up one section on top of another section. This provides a safe construction of the compact transmission lines structure. Further, the short structure may eliminate cambering. Having a modular structure may generate fewer pieces to fabricate and transport.

In one or more embodiments, a compact transmission lines structure system may facilitate that the two diamond-shaped assemblies 104a and 104b may be situated on either side of a center pole of the T-shaped structure. Each diamond-shaped assembly (e.g., 104a or 104b) may be attached to each end of the T-shaped structure in a manner to allow a compact layout of transmission lines that may be attached to the diamond-shaped assemblies 104a and 104b. The center pole may facilitate an additional support connection to an inner point of the diamond-shaped section using a connector bar.

The diamond-shaped assemblies 104a and 104b may be comprised of four points, where each of these four points may include a yoke plate assembly. For example, the inner point of the diamond-shaped assembly 104a may be the point closest to the center pole, the outer point may be the point farthest from the center pole, the upper point of the diamond-shaped assembly 104a may be the point that connects the diamond-shaped assembly 104a to the T-shaped structure, and the lower point of the diamond-shaped assembly 104a may be the point closest to the ground opposite the upper point of the diamond-shaped assembly 104a.

In one or more embodiments, compact transmission lines structure 102 may facilitate that the inner point and the outer point may be directly connected together using a post insulator that connects the yoke plates associated with each of these points. Also, the upper point may be connected to the inner point using an insulator bar and similarly may be connected to the outer point using another insulator bar. In one or more embodiments, compact transmission lines structure 102 may facilitate that a first transmission line may be connected to the inner point, a second transmission line may be connected to the outer point, and a third transmission line may be connected to the lower point.

In one or more embodiments, compact transmission lines structure 102 may facilitate that each of the diamond-shaped assemblies may articulate transverse direction relative to the yoke plate at the inner point and the connector bar. That is, articulation is allowed in the longitudinal and transverse directions. Additionally/alternatively, each of the diamond-shaped sections may not articulate vertically to provide vertical support. That is, the outer point of each of the diamond-shaped sections may rotate laterally in a horizontal direction but not vertically. Further, at the top of the T-shaped structure on top of the compact transmission lines structure 102 may further comprise a shield wire. A shield wire may protect against lightning strokes. If lightning strikes, it would hit the shield wire because it is on top of the structure. The shield wire may protect the actual transmission line from an electrical surge due to the lightning stroke, which may cause a station to trip where the transmission line is connected. Further, the shield wire may be positioned in order to provide a shielding angle of about 30°. It is understood that the above descriptions are for purposes of illustration and are not meant to be limiting.

Figure 2A:
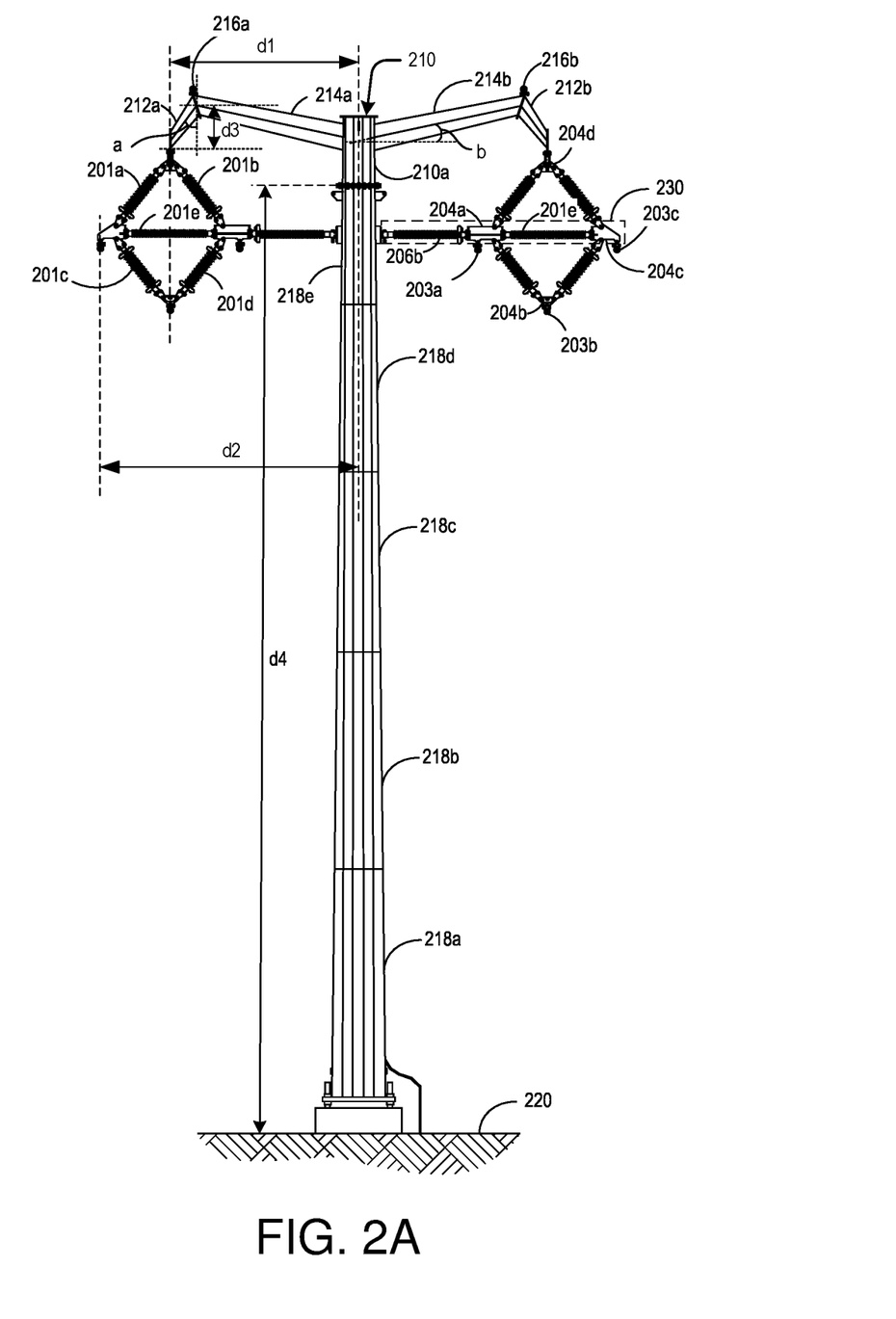
FIG. 2A depicts an illustrative schematic diagram for a compact transmission lines structure, in accordance with one or more example embodiments of the present disclosure.

FIG. 2A depicts an illustrative schematic diagram for a compact transmission lines structure 200, in accordance with one or more example embodiments of the present disclosure.

The compact transmission lines structure system 200 of FIG. 2A may be comprised of one or more subsystems. The double circuit compact transmission line short structure subsystem may be modular sections with flange plates such that it may easily stacked up vertically without the need to use specialized equipment. This provides a safe construction of the compact transmission line structure. Further, the short structure may eliminate cambering. Having a modular structure may generate shorter and lighter pieces to fabricate and transport. The compact transmission line structure system 200 is shown to have a center pole 218 (comprising sections 218a-e) and arm 210 (comprising sections 212a, 214a, 210a, 214b, 212b). For example, it is shown that one stacking order may be starting with section 218a, stacking up on top of it section 218b, followed by section 218c, section 218d, section 218e and finally arm 210. It should be understood that this is only an example and that other order of stacking up may be envisioned and other sections may be selected.

Referring to FIG. 2A, a center pole 218 may be formed after sections 218a-d are stacked up. The center pole 218 is connected to the foundation through a baseplate, the arm 210 may be formed after connecting sections 212a, 214a, 210a, 214b, 212b as a monolithic arm that sits at the top of the center pole 218 to complete the T structure. Section 210a may be connected to the center pole 218 at the top of section 218e through a plate. That connection may be at a predetermined height d4 from the foundation. The left side of the arm may be made up of two sections 212a (beak) and 214a (arm), while the right side of the arm may be made up of another two sections 212b (beak) and 214b (arm). As can be seen in FIG. 2A, sections 212a and 214a are attached to each other through a plate creating a predetermined angle between sections 212a and 214a (e.g., angle a). The same is true for the other side of the arm where sections 212b and 214b are attached to each other using a plate creating a predetermined angle between them. Further, the span of each side of the arm from the center of the arm 210 may be equal to a distance d1. In some examples, the distance d1 may be in the range of 8 to 15 feet. Further, section 212a has a vertical length of d3 from the center of the plate connecting section 212a to section 214a. The same is true about section 212b, which also has a vertical length of d3 from the center of the plate connecting section 212b to section 214b. It is also shown in FIG. 2A that section 214b is elevated by an angle b from the horizontal line. The same is true about section 214a.

In one or more embodiments, there are two forms of the diamond-shaped insulator assembly: 1) a suspension form, or 2) a restrained form. In the case of a suspension form, a suspension diamond-shaped insulator assembly may be formed using four outer perimeter post insulators and an inner horizontal post insulator connected to each other by yoke plate assemblies to form the diamond-shape.

In the case of a restrained form, the diamond-shaped insulator assembly may be formed using four outer perimeter post insulators and an inner horizontal post insulator connected to each other by yoke plate assemblies to form the diamond-shape. However in the restrained form, the diamond-shaped insulator assembly may be connected to the center pole 218. For example, as seen in FIG. 2A, a restrained form of the diamond-shaped insulator assembly is shown. In this example, the diamond-shaped insulator assembly on the left side of the center pole 218 may be made up of outer perimeter post insulator sections 201a-d and an inner horizontal post insulator 201e and diamond-shaped insulator assembly on the right side of the center pole 218 may be made up of similar outer perimeter post insulator sections and inner horizontal post insulator as the left side.

Referring to FIG. 2A, the right side diamond-shaped insulator assembly (which is a mirror image of the left side diamond-shaped insulator assembly) shows yoke plate assemblies 204a-d. These yoke plate assemblies 204a-d connect the outer perimeter sections to each other in order to form the diamond-shaped insulator assembly. In addition, an inner post insulator 201e may connect the yoke plate assemblies 204a to 204c. The post insulator 201e, may help stabilize the diamond-shaped insulator assembly in addition to insulating conductor wires that may be carried by each side of the diamond-shaped structure.

In FIG. 2A, there is shown auxiliary subsystem 230 that may consist of one restraint insulator assembly comprising a post insulator 201e, a specially designed side yoke plate assembly 204a, an outer yoke plate assembly 204c, and a post insulator assembly 206b, where in the side yoke plate 204a is connected to the post insulator 206b. For example, the conductor transverse movement at the structure can be eliminated by using the auxiliary subsystem 230, where the one end of the auxiliary subsystem 230 may have the side yoke plate assembly 204a to be connected to an inner point (e.g., 204c) of the diamond-shaped section and the other end of the auxiliary subsystem 230 having the post insulator assembly 206b connected to the pole at section 218e. The post insulator assembly 206b connection at the pole at section 218e has a hinge, where the hinge allows the rotation of the insulator assembly in a horizontal plane (about vertical axis) and not in a vertical plane (about the longitudinal axis).

In FIG. 2A, there is shown conductor attachment hardware assembly that are connected to the diamond-shaped insulator assembly (left side diamond-shaped insulator assembly and right side diamond-shaped insulator assembly). These may be cushion grip suspension clamps (e.g., cushion grip suspension clamp 203a-c). Each diamond-shaped insulator assembly (e.g., the left side and the right side) support three phase conductors using three cushion grip suspension clamp. For example, each of the three cushion grip suspension clamp 203a, 203b and 203c hold one of three phase conductors that make us one transmission line. So, on the left side diamond-shaped insulator assembly may carry one transmission line having three phase conductors and the right side diamond-shaped insulator assembly may carry one transmission line having three phase conductors. These conductors are not shown in this figure. It should be understood that although there are shown two diamond-shaped insulator assemblies, one on the right and one on the left of the center pole 218, there are scenarios where the two diamond-shaped insulator assemblies may be above each other. In that scenario, a first diamond-shaped insulator assembly may be above a second diamond-shaped insulator assembly. It should be understood that in this scenario, the two diamond-shaped insulator assemblies may be on the right side of the center pole 218 or the left side of the center pole 218 depending on implementation.

Still referring to FIG. 2A, there is an additional shield wire suspension clamps 216a and 216b, where the suspension clamp 216a may be attached at the connector plate between sections 212a and 214a, and where the suspension clamp 216b may be attached at the connector plate between sections 212b and 214b. Each of these additional suspension clamps may be used to support a shield wire (not shown here). A shield wire may protect transmission lines against lightning strokes. If lightning strikes, it would be intercepted by the shield wire because it is located above the phase conductors on top of the structure. The shield wire may protect the phase conductor from a flashover due to the lightning stroke, which may cause the line trip. Further, the shield wire may be positioned in order to provide a shielding angle of about 30°. Each shield wire held by a suspension clamps may also be connected to a ground wire connected to the ground 220. Proper shielding prevents lightning overvoltage due to, for example, lightning stroke to the phase conductor attached to each diamond-shaped insulator assembly on either side of the center pole 218.

Similar to the right side diamond-shaped insulator assembly, the left side insulator assembly may also be comprised of similar parts in order to carry three additional transmission lines. Further, a certain width span may be imposed on the compact transmission lines structure. In addition to distance d1, a distance d2 may be selected such that the span from the center of the center pole 218 to the outermost part of the diamond-shaped insulator assembly is up to 15 feet. This would result in a total span between the opposite ends of the two diamond-shaped insulator assembly to be less than or equal to 30 feet.

The design of the compact transmission line structure 200 may facilitate that transmission lines carried by the diamond-shaped insulator assembly pierced through the clearance window (e.g., clearance window 106 of FIG. 1), which may have a specific area to allow a certain number of transmission lines to be adjacent to each other. Having each diamond-shaped insulator assembly carry up to three transmission lines insurers proper clearance from structures and/or other conductors in the vicinity of these transmission lines while maximizing and optimizing the number of transmission lines that may be used in such clearance window. Ensuring transmission lines meet the design code may minimize interferences between transmission lines and public safety issues. It is understood that the above descriptions are for purposes of illustration and are not meant to be limiting.

Figure 2B:
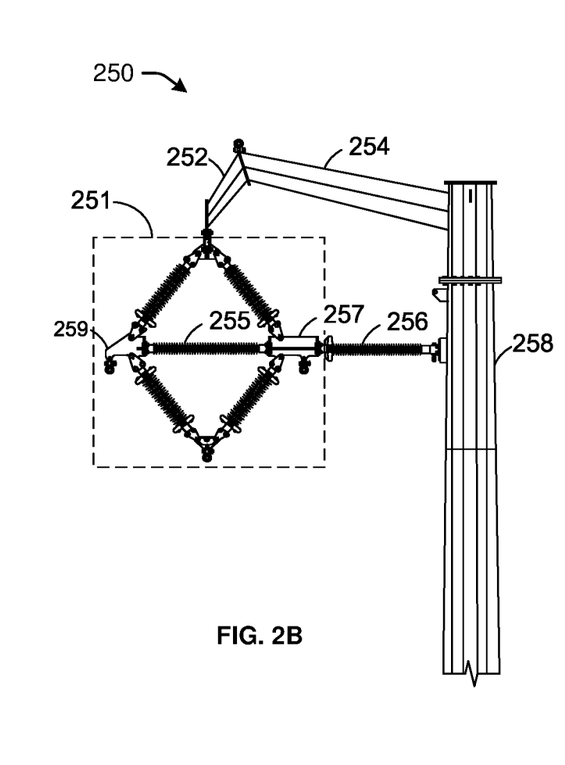
FIGS. 2B-2C depict illustrative schematic diagrams for two forms of a compact transmission lines structure, in accordance with one or more example embodiments of the present disclosure.
Figure 2C:
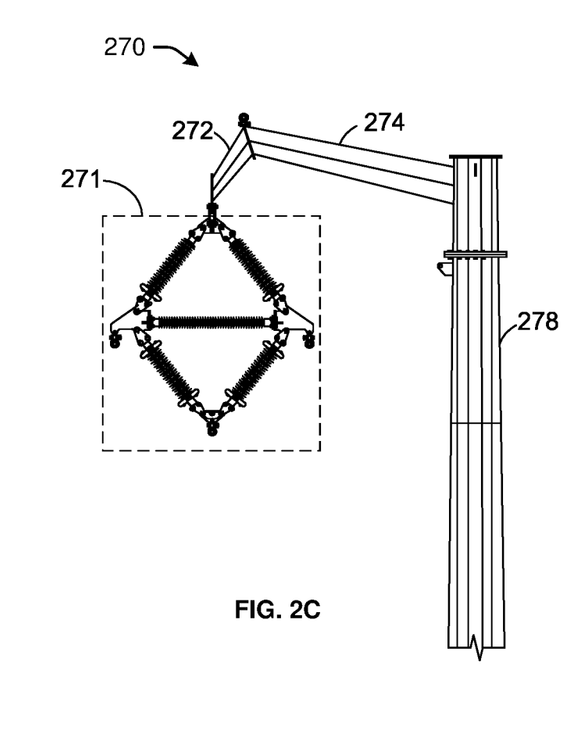

FIGS. 2B-2C depict illustrative schematic diagrams for two forms of a compact transmission lines structure, in accordance with one or more example embodiments of the present disclosure.

Referring to FIG. 2B, there is shown an illustrative diagram 250 of a restrained diamond-shaped insulator assembly 251. The restrained diamond-shaped insulator assembly 251 may be connected to a beak 252, which is connected to an arm 254. The arm 254 is connected to the pole 258. In order to restrain the movements of the restrained diamond-shaped insulator assembly 251, an auxiliary subsystem comprising an inner horizontal post insulator 255, a specially designed side yoke plate 257, an outer post insulator 259, and a post insulator assembly 256.

In this scenario, there is shown a single diamond-shaped insulator assembly attached to a pole resulting in an inverted L-Structure using a restrained diamond-shaped insulator assembly 251. Although this shows a single diamond-shaped insulator assembly it should be understood that this is not a limitation and it is only meant as an illustration of the restrained form of the diamond-shaped insulator assembly.

Referring to FIG. 2C, there is shown an illustrative diagram 270 of a suspension diamond-shaped insulator assembly 271. The suspension diamond-shaped insulator assembly 271 may be the same as the restrained diamond-shaped insulator assembly 251 except that it does not connect to the pole 278. The suspension diamond-shaped insulator assembly 271 may be connected to a beak 272, which is connected to an arm 274. The arm 274 is connected to the pole 278. Since this shows a scenario of a suspension form of a diamond-shaped insulator assembly, the suspension diamond-shaped insulator assembly 271 may not be connected to the pole 278 through a post insulator assembly as was done in FIG. 2B.

In this scenario, there is shown a single diamond-shaped insulator assembly attached to a pole resulting in an inverted L-Structure using a suspension diamond-shaped insulator assembly 271. Although this shows a single diamond-shaped insulator assembly it should be understood that this is not a limitation and it is only meant as an illustration of the restrained form of the diamond-shaped insulator assembly.

Figure 3:
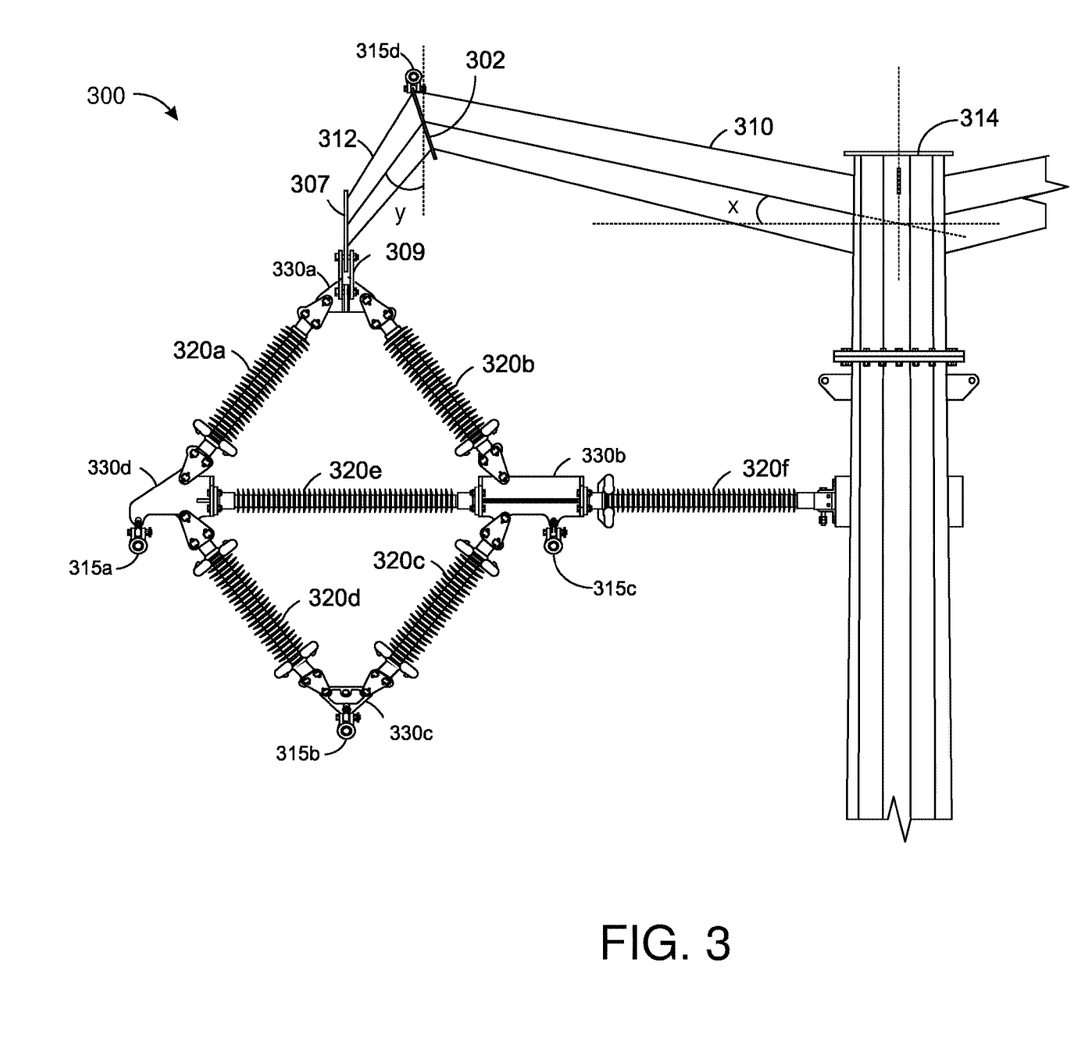
FIG. 3 depicts an illustrative schematic diagram for a compact transmission lines structure, in accordance with one or more example embodiments of the present disclosure.

FIG. 3 depicts an illustrative schematic diagram 300 for compact transmission lines structure, in accordance with one or more example embodiments of the present disclosure.

Referring to FIG. 3, there is shown a center pole 314 connected to a section 310, which in turn is connected to section 312. The section 310 may be connected to the section 312 using a plate 302. This connections between the center pole 314, the section 310, and the section 312 may result in particular angles to form the left side and the right side of the T-shaped structure. For example, it is shown that the section 310 is connected to the center pole 314 at an angle x. In some examples, angle x may be in the range of 10 to 20 degrees. Further, it is shown in FIG. 3 that the section 312 is at an angle y from a vertical direction. In some examples, angle y may be in the range of 30 to 45 degrees.

In one or more embodiments, at the point where the section 310 connects to the section 312, there may be a suspension clamp 315d, that may be used to support a shield wire (not shown here). This shield wire may protect the transmission lines from electric surges due, for example, to lightning strokes, which may cause a station to trip where the transmission line is connected.

Still referring to FIG. 3, where the left side diamond-shaped insulator assembly is shown to be connected to the center pole 314 using an insulator bar 320f. This insulator may be made of silicone rubber polymer with ductile iron end-fittings. Additional insulator bars are shown that connect the various portions of the diamond-shaped insulator assembly. For example, there is shown that the top yolk plate 330a of the diamond-shaped insulator assembly connects to the yolk plate 330b using insulator bar 320b. Also, the yolk plate 330a of the diamond-shaped insulator assembly connects to the yolk plate 330d using insulator bar 320a. Similarly, the yolk plate 330c connects to yolk plate 330b using insulator bar 320c, and the yolk plate 330c connects to yolk plate 330d using insulator bar 320d. Further, the yolk plate 330d may connect to yolk plate 330b using inner horizontal post insulator 320e. The yolk plate 330a may be connected through a strap assembly 309 to a plate connector 307.

In FIG. 3, there is also shown one or more suspension clamps (e.g., suspension clamps 315a, 315b, and 315c). Each of these suspension clamps may hold a phase conductor of a transmission line at a specific location on the diamond-shaped insulator assembly.

It is understood that the above descriptions are for purposes of illustration and are not meant to be limiting.

Figure 4A:
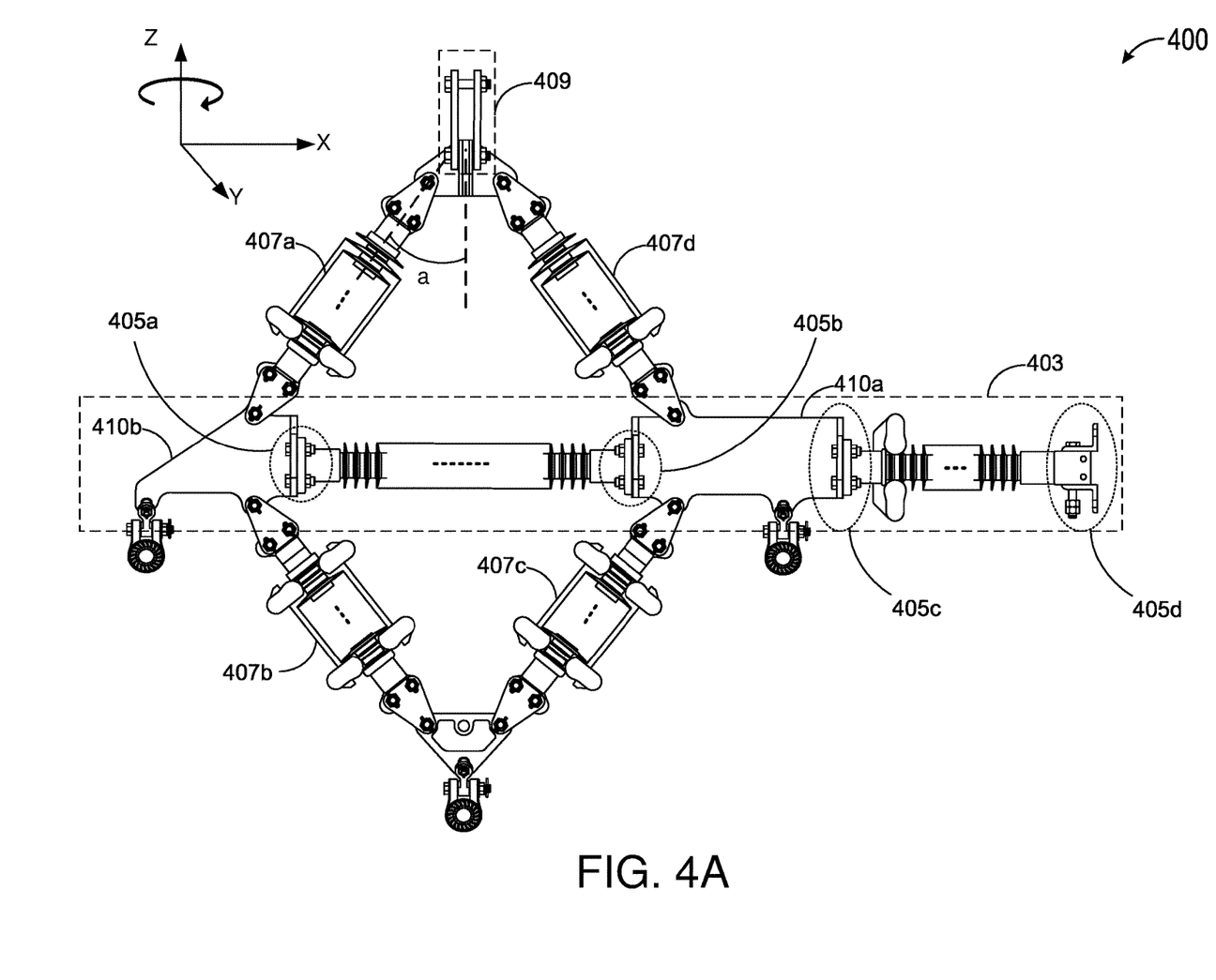
FIGS. 4A-4B depict illustrative schematic diagrams for diamond-shaped insulator assemblies, in accordance with one or more example embodiments of the present disclosure.
Figure 4B:
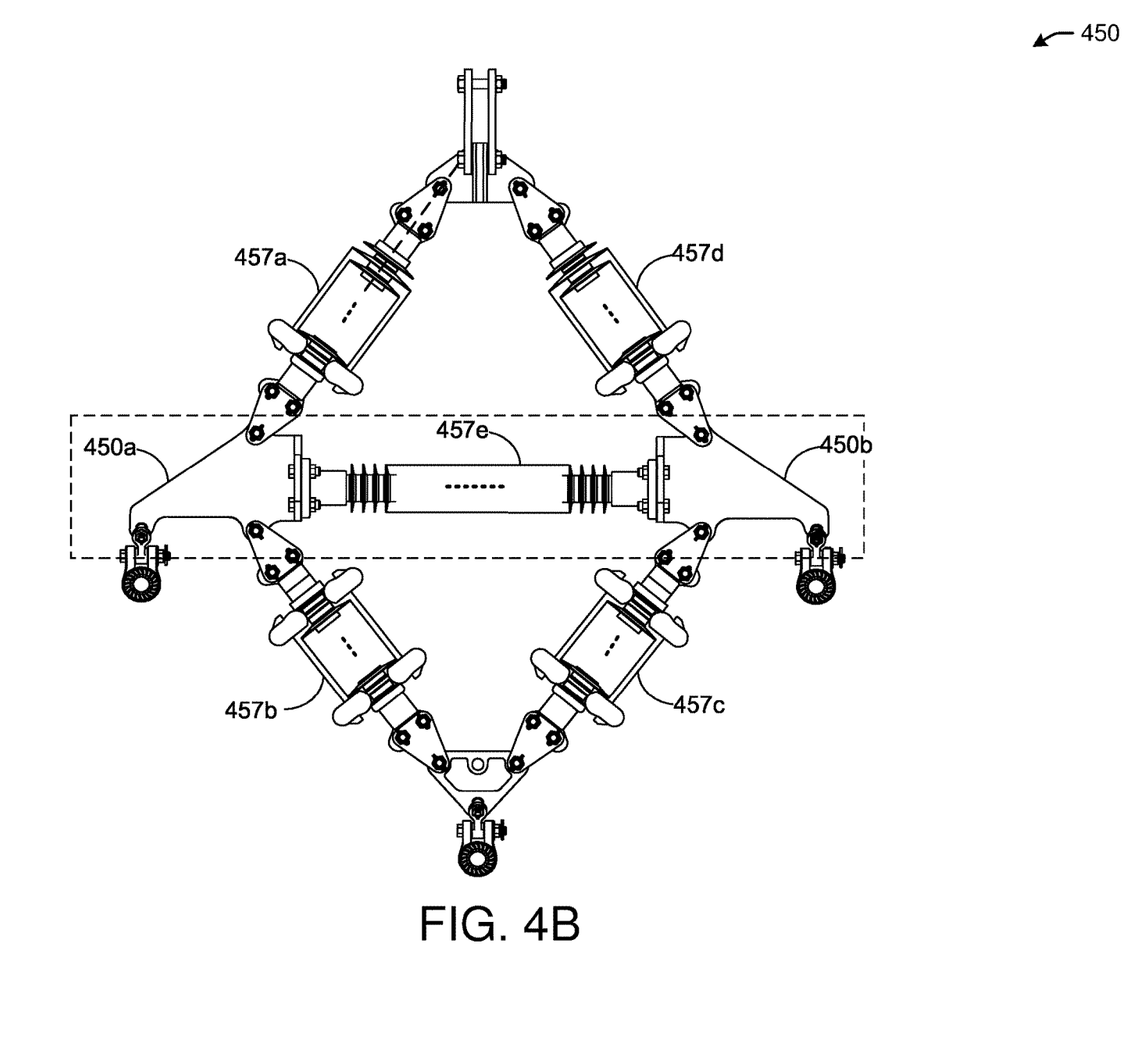

FIGS. 4A-B depict illustrative schematic diagrams for diamond-shaped insulator assemblies 400 and 450 respectively, in accordance with one or more example embodiments of the present disclosure.

Referring to FIG. 4A, there is shown a restrained diamond-shaped insulator assembly 400 of a compact transmission line structure. The restrained diamond-shaped insulator assembly 400 may hang on the compact transmission line structure using a strap assembly 409 (similar to strap assembly 309 being connected to a plate connector 307 of FIG. 3). The restraining feature of the structure may be accomplished by using an auxiliary subsystem 403, which may be comprised of one or more sections. The diamond-shaped insulator assembly 400 may comprise four outer insulator bars (e.g., insulator bar 407a-d). An angle a may be selected based on the application and implementation. For example, in some scenarios, the angle a may be between 30 and 45 degrees. It should understood that this angle a is an example and that other values of angle a may be envisioned.

The auxiliary subsystem 403 may be comprised of two yoke plate assemblies (410a and 410b) connecting various portions of the diamond-shaped insulator assembly 400 to a pole (not shown here). In one or more embodiments, the yoke plate assemblies 410a and 410b may be selected to provide flexibility in order to articulate laterally relative to the pole (not shown here) of the compact transmission line structure. That is, articulation is allowed in the longitudinal and transverse directions (e.g., around the Z-axis). Additionally/alternatively, the diamond-shaped insulator assembly 400 may not articulate vertically. That is, the auxiliary subsystem 403 may rotate laterally approximately around the Z-axis but not vertically.

In one or more embodiments, one or more bolts may hold the yoke plate assemblies to insulator bars. For example, looking at auxiliary subsystem 403, the bolts 405a are shown to connect yoke plate assembly 410b to an inner insulator bar, which is also connected to the yoke plate assembly 410a using bolts 405b. The yoke plate assembly 410a is also to insulator bar using bolts 405c. That insulator bar is also connected to the pole using bolts 405d. These various bolts may be selected based on strength criteria. The strength criteria may be based on the flexibility of the auxiliary subsystem 403. For example, in case of situations that may cause a swaying of the diamond-shaped insulator assembly 400, it is important to ensure that this structure does not snap immediately. Instead, it is desirable to provide a warning sign to technicians that swaying of the diamond-shaped structure 400 has occurred, which would indicate to a technician that maintenance may be required to ensure proper operation of the diamond-shaped insulator assembly 400 to carry transmission lines. The bolts 405a-d may be selected to ensure the longitudinal movements can occur without immediate failure of the portion 403 as the longitudinal movement is occurring. For example under a stress situation, using bolts that do not meet the strength criteria, may result in a failure at the joint where the bolts are connecting two pieces together instead of allowing the pieces (e.g., yoke plate assembly 410a) to flex and to articulate approximately around the z-axis.

Referring to FIG. 4B, there is shown a diamond-shaped insulator assembly in a suspension form instead of a restrained form (FIG. 4A). In this case the suspension diamond-shaped insulator assembly 450 is not restrained, such that the suspension diamond-shaped insulator assembly 450 does not need to connect to the pole (not shown here).

The suspension diamond-shaped insulator assembly 450 may comprise four outer insulator bars (e.g., insulator bar 457a-d) and one inner insulator bar 457e. The suspension diamond-shaped insulator assembly 450 may have two similar yoke assemblies 450a and 450b on right and left sides of the suspension diamond-shaped insulator assembly 450.

It is understood that the above descriptions are for purposes of illustration and are not meant to be limiting.

Figure 5:
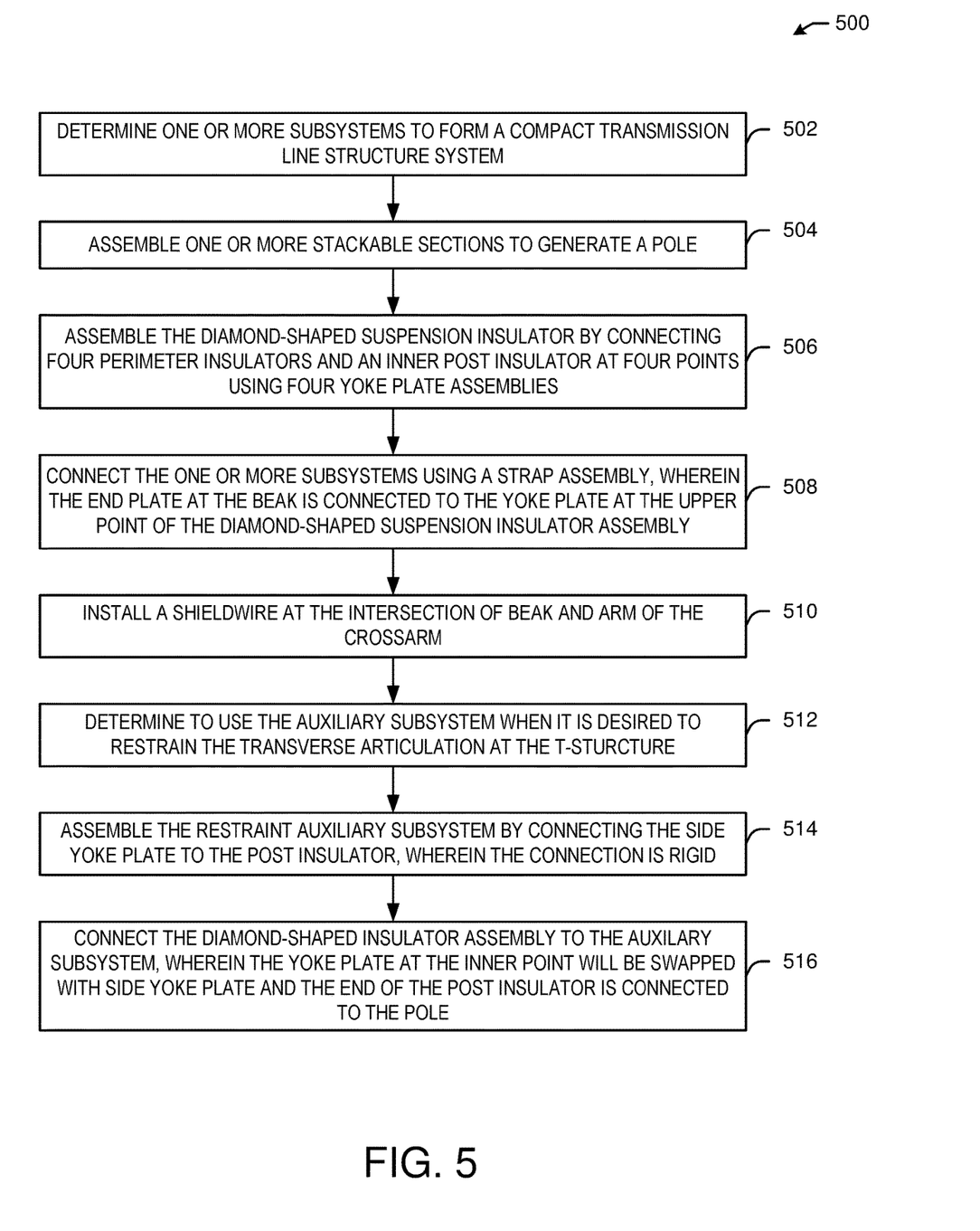
FIG. 5 illustrates a flow diagram of process for an illustrative compact transmission line structure system, in accordance with one or more example embodiments of the present disclosure.

FIG. 5 illustrates a flow diagram of process 500 for an illustrative compact transmission lines structure system, in accordance with one or more example embodiments of the present disclosure.

At block 502, a method may comprise determine one or more subsystems to form a compact transmission line structure system, wherein the one or more subsystems comprise a short structure subsystem, a diamond-shaped insulator assembly subsystem, and an auxiliary restraint subsystem, wherein the short structure subsystem comprises a pole and a monolithic crossarm, wherein the diamond-shaped insulator assembly subsystem comprises perimeter insulators, post insulator, yoke plates, and conductor clamps, and wherein the auxiliary restraint subsystem comprise a side yoke plate assembly and a post insulator.

At block 504, the method may comprise assemble one or more stackable sections to generate a pole. The method may further comprise stacking the monolithic crossarm on top of the pole, wherein the crossarm may comprise one or two arms connected to an ascender at a predetermined angle, and a beak connected to the arm at a predetermined angle. An inverted L-Structure crossarm may be configured by connecting a beak to an arm to the left or right of the ascender. A T-Structure crossarm may be configured by connecting beak to an arm on both side of the ascender, wherein the left side and right side may be mirror image about the ascender.

At block 506, the method may comprise assemble the diamond-shaped suspension insulator by connecting four perimeter insulators and an inner post insulator at four points using four yoke plate assemblies. In some scenarios, an inverted L-Structure may use one diamond-shaped insulator assembly. A T-Structure may use two diamond shaped insulator assembly.

At block 508, the method may comprise connect the one or more subsystems using a strap assembly, wherein the end plate at the beak is connected to the yoke plate at the upper point of the diamond-shaped suspension insulator assembly.

At block 510, the method may comprise install a shield-wire at the intersection of beak and arm of the crossarm.

At block 512, the method may determine to use the auxiliary subsystem when it is desired to restrain the transverse articulation at the T-structure.

At block 514, the method may comprise assemble the restraint auxiliary subsystem by connecting the side yoke plate to the post insulator, wherein the connection is rigid.

At block 516, the method may connect the diamond-shaped insulator assembly to the auxiliary subsystem, wherein the yoke plate at the inner point will be swapped with side yoke plate and the end of the post insulator is connected to the pole.

It is understood that the above descriptions are for purposes of illustration and are not meant to be limiting.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The following aspects pertain to further embodiments.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a compact transmission line structure for carrying transmission lines. The compact transmission line structure also includes a first subsystem of a pole and a crossarm, where the crossarm is stacked above the pole, where the crossarm includes a cantilever end situated away from the pole. The compact transmission line structure also includes a second subsystem connected to the cantilever end, the second subsystem including: a first diamond-shaped insulator assembly supporting a first single three-phase transmission line, the first diamond-shaped insulator assembly formed by four perimeter insulators and an inner horizontal post insulator connected to each other by one or more yoke plates, where the first diamond-shaped insulator assembly holds a first three-phase transmission line; where the first three-phase transmission line includes: a first phase having single or bundled conductors; a second phase having single or bundled conductors; and a third phase having single or bundled conductors, where phase conductors of the first three-phase transmission line are arranged in a equilateral delta or isosceles delta configuration that allow the phase conductors to run parallel to each other at a proper phase spacing. The compact transmission line structure also includes a third subsystem connected to the cantilever end, the third subsystem including a second diamond-shaped insulator assembly supporting a second three-phase transmission line, where the second diamond-shaped insulator assembly mirrors the first diamond-shaped insulator assembly; and at least two shield wires configured to provide lightning protection. Other embodiments of this aspect include corresponding computer systems, apparatus, and computer programs recorded on one or more computer storage devices, each configured to perform the actions of the methods.

Implementations may include one or more of the following features. The compact transmission line structure further included of: a first upper yoke plate associated with the second subsystem, where the first upper yoke plate is configured to withstand a weight of the second subsystem; and a second upper yoke plate associated with the third subsystem, where the second upper yoke plate is configured to withstand the weight of the third subsystem; An end plate at the cantilever end of the crossarm connects with the first upper yoke plate using a strap assembly, where the strap assembly is configured to allow articulation of the first diamond-shaped insulator assembly in longitudinal and transverse directions but not in a vertical direction. The compact transmission line structure further including: a first shield wire situated on top of a connection plate between a left arm and a left beak forming a left portion of the crossarm; and a second shield wire situated on top of a connection plate between a right arm and a right beak forming a right portion of the crossarm. The first shield wire provides a shielding angle of approximately 30, protecting the first three-phase transmission line from lightning strokes. The second shield wire provides a shielding angle of approximately 30, protecting the second three-phase transmission line from lightning strokes. The crossarm is a monolithic crossarm, where the left beak and the left arm are connected to form a first predetermined angle, and where a left arm is connected to a short vertical ascender at a second predetermined angle, where a left section of the crossarm and a right section of the crossarm include mirror image parts. Includes a width less than or equal to 30 feet wide and including a height less than or equal to 45 feet. Each of the first phase, the second phase, and the third phase operates at or over 115 kv volts phase to ground. The first diamond-shaped insulator assembly further includes phase conductor clamps connected to other parts of the first diamond-shaped insulator assembly by a yoke plate assembly. The compact transmission line structure further including an auxiliary subsystem including a side yoke plate assembly and a post insulator that connect an inner point of the first diamond-shaped insulator assembly to the pole; An inner point of the first diamond-shaped insulator assembly may be connected to the pole through an auxiliary subsystem, where the auxiliary subsystem is configured to allow articulation of the first diamond-shaped insulator assembly longitudinally, but not in a transverse direction and a vertical direction. The phases operate at or over 115 kv volts phase to ground. Implementations of the described techniques may include hardware, a method or process, or computer software on a computer-accessible medium.

One general aspect includes a compact T-structure configured for carrying up to two transmission lines. The compact T-structure also includes a first subsystem including: a center pole; and a monolithic crossarm, where the monolithic crossarm is stacked above the pole for assembling the compact T-structure, where the monolithic crossarm includes a short vertical section called ascender to which is a left section and a right section is attached forming cantilever sections, where the right section and the left section include mirror image parts, where each section is included of an upswept arm and a short beak part connected together using a plate. The compact T-structure also includes a second subsystem including: a first diamond-shaped insulator assembly that includes three wire connectors, where the wire connectors allow three conductor wires to run parallel to each other; a second diamond-shaped insulator assembly included of an additional three wire connectors, where the wire connectors allow three conductor wires to run parallel to each other; a first attachment bar that connects the first diamond-shaped insulator assembly to the center pole; and a second attachment bar that connects the second diamond-shaped insulator assembly to the center pole. Other embodiments of this aspect include corresponding computer systems, apparatus, and computer programs recorded on one or more computer storage devices, each configured to perform the actions of the methods.

Implementations may include one or more of the following features. The compact T-structure where a horizontal span of the compact T-structure is less than or equal to 30 feet wide. A first shield wire situated on top of the right section of the monolithic crossarm provides a shielding angle of approximately 30. The first diamond-shaped insulator assembly is included of four insulators, where each insulator is connected to another insulator by a yoke plate assembly. The first diamond-shaped insulator assembly and the second diamond-shaped insulator assembly are capable of articulating in a longitudinal direction but not in a vertical direction. A side yoke plate assembly connecting side portions of the first diamond-shaped insulator assembly is capable of withstanding longitudinal force to allow flexibility. The upswept arm and the short beak part of the each of the right section and the left section are connected together to form a first predetermined angle, and where upswept arm of the each of the right section and the left section is connected to the center pole at a second predetermined angle. Implementations of the described techniques may include hardware, a method or process, or computer software on a computer-accessible medium.

One general aspect includes a compact inverted L-structure configured system for carrying a single circuit. The compact inverted L-structure configured system also includes a first subsystem including of a pole and a unique monolithic crossarm, the crossarm may be stacked above the pole for assembling the inverted L-structure, where the crossarm is included of a short vertical section called ascender to which is attached a horizontal section, where the horizontal section is included of an upswept arm and a short beak part connected together using a plate. The compact inverted L-structure configured system also includes a second subsystem including a diamond-shaped insulator assembly included of three wire connectors forming the single circuit, where the wire connectors allow three conductor wires to run parallel to each other, where the second subsystem further includes an attachment bar that connects the diamond-shaped insulator assembly to the beak part of the compact inverted L-structure. Other embodiments of this aspect include corresponding computer systems, apparatus, and computer programs recorded on one or more computer storage devices, each configured to perform the actions of the methods.

Implementations may include one or more of the following features. The compact inverted L-structure where a horizontal span of the inverted L-structure is less than or equal to 15 feet wide. The second subsystem further includes an auxiliary subsystem to connect the diamond-shaped insulator assembly to the pole forming a restrained diamond-shaped insulator assembly. The diamond-shaped insulator assembly is suspended without connection to the pole. Implementations of the described techniques may include hardware, a method or process, or computer software on a computer-accessible medium.

Embodiments according to the disclosure are in particular disclosed in the attached claims directed to a method, a storage medium, a device, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description but is not intended to be exhaustive or to limit the scope of embodiments to the precise form disclosed. Modifications and variations are possible in light of the above teachings or may be acquired from practice of various embodiments.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The various embodiments claimed herein include many alternative and equally satisfactory embodiments without departing from the spirit or essential characteristics thereof. Those of ordinary skill in the art having the benefits of the teachings herein will quickly realize beneficial variations and modifications on the preferred embodiments disclosed herein such as that discussed in the above paragraph, all of which are intended to be within the scope of the disclosure. The one or more embodiments disclosed above must consequently be considered illustrative and not limiting of the scope of the disclosure.

What is claimed is:

1. A compact transmission line structure for carrying transmission lines, comprising of:
   a first subsystem of a pole and a crossarm, wherein the crossarm is stacked above the pole, wherein the crossarm comprises a cantilever end situated away from the pole;
   a second subsystem connected to the cantilever end, the second subsystem comprising:
      a first diamond-shaped insulator assembly supporting a first single three-phase transmission line, the first diamond-shaped insulator assembly formed by four perimeter insulators and an inner horizontal post insulator connected to each other by one or more yoke plates, wherein the first diamond-shaped insulator assembly holds a first three-phase transmission line forming a lower triangle;

wherein the first three-phase transmission line comprises:
a first phase having single or bundled conductors located at a first plane;
a second phase having single or bundled conductors located at the first plane; and
a third phase having single or bundled conductors located at a second plane, wherein the second plane is below the first plane,
wherein phase conductors of the first three-phase transmission line are arranged in a equilateral delta or isosceles delta configuration that allow the phase conductors to run parallel to each other at a proper phase spacing;
a third subsystem connected to the cantilever end, the third subsystem comprising a second diamond-shaped insulator assembly supporting a second three-phase transmission line, wherein the second diamond-shaped insulator assembly mirrors the first diamond-shaped insulator assembly; and
at least two shield wires configured to provide lightning protection.

2. The compact transmission line structure of claim 1, further comprised of:
a first upper yoke plate associated with the second subsystem, wherein the first upper yoke plate is configured to withstand a weight of the second subsystem; and
a second upper yoke plate associated with the third subsystem, wherein the second upper yoke plate is configured to withstand the weight of the third subsystem.

3. The compact transmission line structure of claim 1, further comprising:
a first shield wire situated on top of a connection plate between a left arm and a left beak forming a left portion of the crossarm; and
a second shield wire situated on top of a connection plate between a right arm and a right beak forming a right portion of the crossarm.

4. The compact transmission line structure of claim 3, further comprising wherein the first shield wire provides a shielding angle of approximately 30°, protecting the first three-phase transmission line from lightning strokes.

5. The compact transmission line structure of claim 3, wherein the second shield wire provides a shielding angle of approximately 30°, protecting the second three-phase transmission line from lightning strokes.

6. The compact transmission line structure of claim 3, wherein the crossarm is a monolithic crossarm, wherein the left beak and the left arm are connected to form a first predetermined angle, and wherein a left arm is connected to a short vertical ascender at a second predetermined angle, wherein a left section of the crossarm and a right section of the crossarm comprise mirror image parts.

7. The compact transmission line structure of claim 1, wherein comprises a width less than or equal to 30 feet wide and comprising a height less than or equal to 45 feet.

8. The compact transmission line structure of claim 1, wherein each of the first phase, the second phase, and the third phase operates at or over 115 kV volts phase to ground.

9. The compact transmission line structure of claim 1, wherein the first diamond-shaped insulator assembly further comprises phase conductor clamps connected to other parts of the first diamond-shaped insulator assembly by a yoke plate assembly.

10. The compact transmission line structure of claim 1, further comprising an auxiliary subsystem comprising a side yoke plate assembly and a post insulator that connect an inner point of the first diamond-shaped insulator assembly to the pole.

11. The compact transmission line structure of claim 2, wherein an end plate at the cantilever end of the crossarm connects with the first upper yoke plate using a strap assembly, wherein the strap assembly is configured to allow articulation of the first diamond-shaped insulator assembly in longitudinal and transverse directions but not in a vertical direction.

12. The compact transmission line structure of claim 1, wherein an inner point of the first diamond-shaped insulator assembly may be connected to the pole through an auxiliary subsystem, wherein the auxiliary subsystem is configured to allow articulation of the first diamond-shaped insulator assembly longitudinally, but not in a transverse direction and a vertical direction.

13. The compact transmission line structure of claim 1, wherein the phases operate at or over 115 kV volts phase to ground.

14. A compact T-structure configured for carrying up to two transmission lines, the compact T-structure is comprised of two subsystem:
a first subsystem comprising:
a center pole; and
a monolithic crossarm, wherein the monolithic crossarm is stacked above the pole for assembling the compact T-structure, wherein the monolithic crossarm comprises a short vertical section called ascender to which is a left section and a right section is attached forming cantilever sections, wherein the right section and the left section comprise mirror image parts, wherein each section is comprised of an upswept arm and a short beak part connected together using a plate; and
a second subsystem comprising:
a first diamond-shaped insulator assembly that comprises three wire connectors, wherein the wire connectors allow three conductor wires to run parallel to each other, wherein the three conductor wires form a first lower triangle;
a second diamond-shaped insulator assembly comprised of an additional three wire connectors, wherein the additional wire connectors allow additional three conductor wires to run parallel to each other, wherein the additional three conductor wires form a second lower triangle;
a first attachment bar that connects the first diamond-shaped insulator assembly to the center pole; and
a second attachment bar that connects the second diamond-shaped insulator assembly to the center pole.

15. The compact T-structure of claim 14, wherein a horizontal span of the compact T-structure is less than or equal to 30 feet wide.

16. The compact T-structure of claim 14, wherein a first shield wire situated on top of the right section of the monolithic crossarm provides a shielding angle of approximately 30°.

17. The compact T-structure of claim 14, wherein the first diamond-shaped insulator assembly is comprised of four insulators, wherein each insulator is connected to another insulator by a yoke plate assembly.

18. The compact T-structure of claim 14, wherein the first diamond-shaped insulator assembly and the second diamond-shaped insulator assembly are capable of articulating in a longitudinal direction but not in a vertical direction.

19. The compact T-structure of claim 14, wherein a side yoke plate assembly connecting side portions of the first diamond-shaped insulator assembly is capable of withstanding longitudinal force to allow flexibility.

20. The compact T-structure of claim 14, wherein the upswept arm and the short beak part of the each of the right section and the left section are connected together to form a first predetermined angle, and wherein upswept arm of the each of the right section and the left section is connected to the center pole at a second predetermined angle.

21. A compact inverted L-structure configured system for carrying a single circuit, wherein the compact inverted L-structure is comprised of two subsystem:

a first subsystem comprising of a pole and a unique monolithic crossarm, the crossarm may be stacked above the pole for assembling the inverted L-structure, wherein the crossarm is comprised of a short vertical section called ascender to which is attached a horizontal section, wherein the horizontal section is comprised of an upswept arm and a short beak part connected together using a plate;

a second subsystem comprising a diamond-shaped insulator assembly comprised of three wire connectors forming the single circuit, wherein the wire connectors allow three conductor wires to run parallel to each other, wherein the three conductor wires form a lower triangle, wherein the second subsystem further comprises an attachment bar that connects the diamond-shaped insulator assembly to the beak part of the compact inverted L-structure.

22. The compact inverted L-structure of claim 21, wherein a horizontal span of the inverted L-structure is less than or equal to 15 feet wide.

23. The compact inverted L-structure of claim 21, wherein the second subsystem further comprises an auxiliary subsystem to connect the diamond-shaped insulator assembly to the pole forming a restrained diamond-shaped insulator assembly.

24. The compact inverted L-structure of claim 21, wherein the diamond-shaped insulator assembly is suspended without connection to the pole.

\* \* \* \* \*